United States Patent [19]
Ciaravino et al.

[11] Patent Number: 5,697,706
[45] Date of Patent: Dec. 16, 1997

[54] MULTI-POINT TEMPERATURE PROBE

[75] Inventors: Joseph Ciaravino, Huntington Woods, Mich.; Peter Stryker, Lewisburg, Pa.

[73] Assignee: Chrysler Corporation, Auburn Hills, Mich.

[21] Appl. No.: 576,996

[22] Filed: Dec. 26, 1995

[51] Int. Cl.⁶ ............................................. G01K 7/00
[52] U.S. Cl. ................................................ 374/166
[58] Field of Search ............................ 374/110, 137, 374/144, 145, 163, 166, 179, 180, 208

[56] References Cited

U.S. PATENT DOCUMENTS

| | | |
|---|---|---|
| 1,422,672 | 7/1922 | Coghlan . |
| 2,839,594 | 6/1958 | Schneidersmann ............... 136/4 |
| 3,745,828 | 7/1973 | Howell ................................ 73/295 |
| 3,886,912 | 6/1975 | Haglund ............................ 374/144 |
| 3,923,552 | 12/1975 | Parris ................................ 136/234 |
| 4,075,036 | 2/1978 | Lysikov ............................ 374/179 |
| 4,385,197 | 5/1983 | Schwagerman ................. 136/221 |
| 4,912,977 | 4/1990 | Hope .................................. 73/295 |
| 5,064,506 | 11/1991 | Spauenberg et al. ........... 374/166 |
| 5,192,132 | 3/1993 | Pelensky ........................... 374/166 |
| 5,201,840 | 4/1993 | Sausner et al. .................. 374/145 |

OTHER PUBLICATIONS

"Quality Assurance for Combustion Chamber Thermal boundary Conditions—A Combined Experimental and Analytical Approach", N.J.Owen, K.Robinson and N.S. Jackson, Ricardo Consulting Engineers Ltd., pp. 577–591.

*Primary Examiner*—George M. Dombroske
*Assistant Examiner*—William L. Oen
*Attorney, Agent, or Firm*—Kenneth H. MacLean

[57] ABSTRACT

A temperature probe assembly for reading heat gradients occurring in internal combustion engines or other components. The assembly has a plurality of separate thermocouples each having an inner junction mounted in an associated heat contact ring. These rings are mounted in spaced relationship on a tip of a cylindrical probe member to provide axially spaced and multiple heat pick-up points when the tip is mounted in a test bore in the cylinder head near the combustion chamber. Leads from the thermocouples feed to separate gages remote from the engine. The gages collectively detect temperature gradient by reading electric currents proportional to temperature occurring in the thermocouples during engine testing.

8 Claims, 2 Drawing Sheets

MULTI-POINT TEMPERATURE PROBE

FIELD OF THE INVENTION

This invention relates generally to the measurement of heat flux as conducted through a wall of finite thickness, and more specifically to temperature gradient measurement of gas side combustion chamber heat transfer of an automotive internal combustion engine.

DESCRIPTION OF RELATED ART

With the need for improved validation of internal combustion engines such as those designed with the aid of computers and engine design programs, and with higher emissions and fuel economy standards for vehicles powered by such engines, there has been increased emphasis on the importance of accurate measurement and analysis of the thermal boundary conditions of combustion chamber components. Current equipment and methods of heat flux measurement involving measurement of heat conducted through the gas side combustion chamber walls generally do not meet higher standards for accuracy, versatility, economy and test procedures. Such prior art equipment and methods usually involve traversing thermocouples, separate flux-path thermocouples, and thin film heat flux meters that produce data that does not meet the needs or standard for new engine development involving higher technology levels.

The traversing thermocouple for such measurements requires steady state engine conditions. To acquire a single flux measurement with such devices, an operator is required to be present in the engine test cell and physically traverse the thermocouple probe and change the position of the thermocouple while the engine is operating. This process involves a finite period of time which is a function of the number of probes and is subject to errors from the varying engine operating conditions as well as operator error. Even small deviations in the engine temperature field can cause large errors in the calculated heat flux.

The traditional fixed-point thermocouples consist of a plurality of single read thermocouples each of which is installed along a heat flux path preferably at different bore depths. The installation process is difficult because a large number of separate holes must be drilled in the engine block or head, one for each thermocouple which is welded therein. Each bore hole that is drilled is a further disturbance to the normal engine heat flux path that may cause errors and detract from the analysis. The precise location of the thermocouple bead or contact is difficult to determine and the quality of thermal contact between the bead and engine component block or head is unknown. Such thermocouples are not reusable, and if there is a failure at the thermocouple junction, the site is no longer usable without an expensive and time consuming machining operation to reestablish the bore.

A variation on the flux-path thermocouple involves the use of a thin film thermocouple installed on the bore surface and a traditional thermocouple installed in the bore wall of a cylinder head. Such thin film thermocouples have the advantage of very quick response time but have the disadvantage of an uncertain operating life due to the harsh combustion engine environment to which they are subjected. Like traditional thermocouples, they are not reusable nor easily replaceable.

SUMMARY OF THE INVENTION

In one preferred form, the gradient probe of this invention comprises several split rings of a suitable material or alloy that is a good conductor of heat energy, beryllium/copper for example. These rings are linearly spaced from one another in annular grooves on the tip end of a hollow housing of an insular material such as ceramic or other suitable refractory material. Individual fine-wire thermocouples have inner needle-like junctions respectively connected within or to an associated one of the split rings and have the fine wire leads routed out through the axial center of the probe housing.

The split rings are resilient members sized slightly larger than the drilled bore hole in the engine cylinder head or other part being gaged. The ring resilience insures positive thermal contact with the cylindrical wall of the hole. The outer surface of the rings may be designed with a circular profile to obtain definable single annular line contact with the cylindrical wall of the drilled hole in the piece being gaged. The depth of the bore holes are known and the thermal contact points are accurately established.

The split in each of the rings provides a slot that mates with some clearance with a tab in the inner grooves in the tip. This mating tab and slot construction prevents rotation of the rings relative to the probe housing, particularly during probe installation. The thermocouple junction and fine wires thereof may be potted into the probe to stabilize the thermocouple and its inner junction therein. Suitable gages, such as galvanometers are operatively connected to the thermocouples at a comfortable station away from the probe. These gages more precisely reflect the different electrical currents and thereby the temperature gradient experienced by the part being tested.

The probe housing is fitted into a sheath of a suitable material such as stainless steel which is internally threaded at the outboard end for retaining a threaded thumb screw. A resilient retaining washer disposed between the thumb or cap screw and the end of the housing allows for relative thermal expansion of the parts of the probe to prevent damage thereto. An O-ring is fitted onto an annular shoulder at the end of the sheath seals the probe and the tip from coolants or other matter which may adversely effect probe accuracy. The sheath is fitted inside an outer housing and mounting member and held in place by a compression fitting mounted therein. The outer housing is threaded into the outer wall of the engine block of the cylinder head thereof. A tapered compression sleeve fits into the tapered inner end of the outer housing to grip and hold the sheath as a nut threaded on the end of the fitting is advanced to a retaining position.

This invention advances the state of the art by providing accurate and instantaneous heat flux measurements at a variety of sites since the temperature gradient reading probes can be readily installed in a minimal number of holes drilled into the engine being tested. This eliminates the requirement for large numbers of drilled holes or bores used in some prior art test procedures. Also the requirement for temperature stabilization of the engine being measured is eliminated while heat flux measurements can be made during engine operating transients. This invention further uses small contact rings for each thermocouple optimally sized to minimize disturbance of the natural heat flow in the part being measured. The needle-like junctions of the two fine wires of each probe will in effect register the temperature at the junction point without serious absorption of heat from its surroundings. These rings importantly provide positive and definable thermal contact points along a gradient which can be readily read and recorded. The probes of this invention can be readily made with standard manufacturing techniques.

With this invention, only simple machining operations are required to prepare the engine being measured for installation of the probe, the bore site can be kept to a minimum number since each site produces a plurality of accurate readings and the probe can be easily installed with ordinary mechanical skill.

This invention further enhances testing since it does not require operator presence within the relatively uncomfortable environment of the engine test cell such as for adjusting thermocouples and accumulating data during the data collection period. Data can be readily collected remotely at comfortable stations separate from the test cell and such collection can be made in greatly improved environments.

One objective of this invention is to provide a new and improved method of making instantaneous heat flux probes and making the measurement of the critical regions within the combustion chamber of an internal combustion engine.

Another objective of this invention is to provide a new and improved multi-point gradient temperature probe which is economical and easy to manufacture, easy to install, replaceable without engine disassembly, and is reusable. This probe provides design flexibility to accommodate a variety of different installation locations in a wide range of internal combustion engines.

These and other features of the invention will become more apparent from the following detailed description and drawing in which:

DETAILED DESCRIPTION OF THE DRAWINGS

Figure 1:
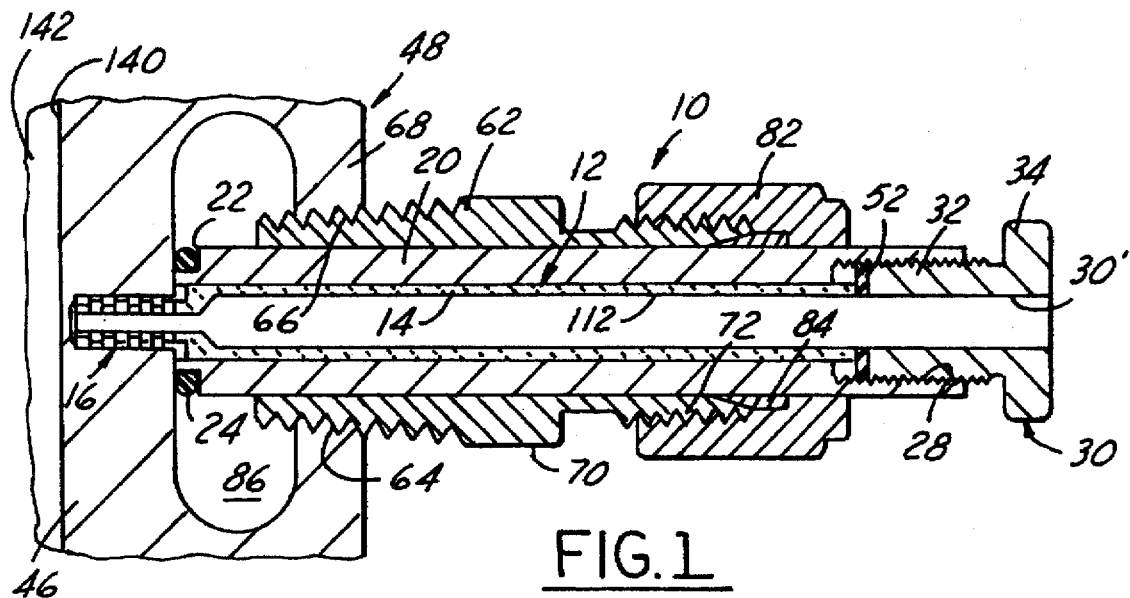
FIG. 1 is a sectional view of one embodiment of the temperature probe of this invention as installed in a block of an internal combustion engine.
Figure 2:
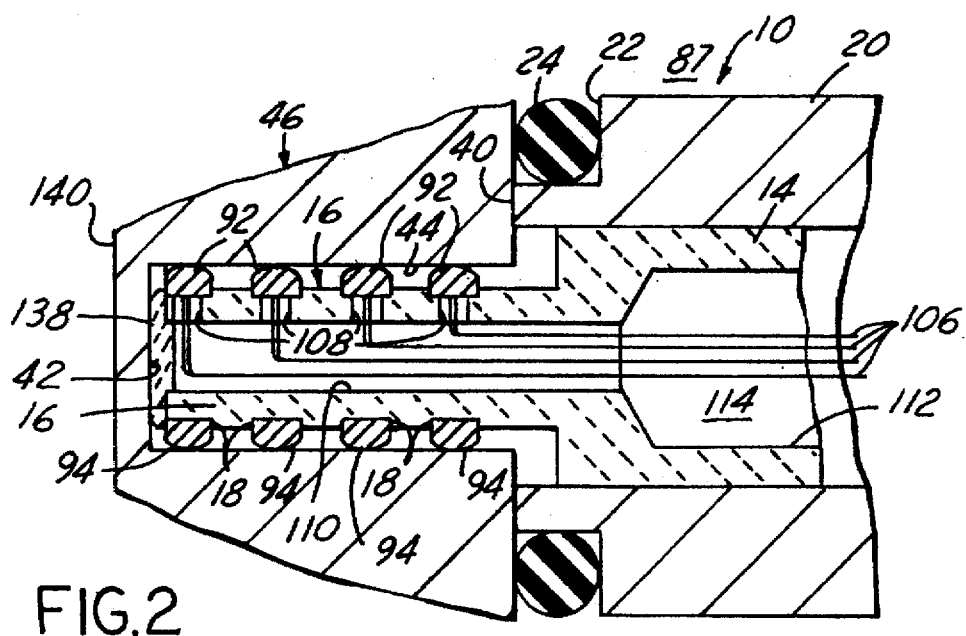
FIG. 2 is a sectional view showing the tip portion of the probe of FIG. 1.

Turning now to FIG. 1, there is shown a multi-point temperature probe assembly 10 having an elongated, tubular probe member 12 of ceramic or other suitable refractory material. The probe member has an elongated cylindrical main body portion 14 and a smaller stepped-diameter tip portion 16 extending from one end thereof. As shown in FIG. 2, the tip portion has annular grooves 18 formed therein and which are spaced along the extent of the tip portion.

The main body 14 of the probe is housed within a tubular sheath 20 of stainless steel or other suitable material. An inner end of the sheath has an annular stepped diameter shoulder 22 that forms a seat for an elastomeric O-ring seal 24. The outboard end of the sheath 20 is bored and internally threaded at 28 to accommodate a retainer cap 30.

As shown, the retainer cap 30 has a shank 32 which threadedly mates with the threads of the outboard end of the sheath 20 and has an outer head portion 34 which can be knurled or formed with suitable flats for adjustment tools. During attachment of the assembly 10, the cap 30 is turned by hand or by suitable tooling to move to a point whereby the end of the probe member tip extends to a predetermined distance beyond the annular end 40 of the sheath or to a point that it engages the bottom surface 42 of a bore 44 of known depth drilled into the inner wall 46 of the engine's cylinder head 48.

A washer 52 of resilient material is disposed between the shank 32 and the outboard end of the ceramic probe member 12 to accommodate relative expansion of the parts while the retainer cap and washer retains the probe within sheath 20. When the probe member is installed, the probe is firmly seated against the bottom surface 42 of bore 44 drilled to a known depth in the inner wall 46 of the cylinder head 48.

In addition to the ceramic inner probe member and metallic sheath, there is a generally cylindrical outer metallic housing 62 having an externally threaded inboard end 64 which is adapted to be advanced into a correspondingly threaded opening 66 in the outer wall 68 of the cylinder head 48 of the internal combustion engine 50.

The probe housing 62 also has flats 70 arranged in a polygonal shape for turning installation with a wrench or other suitable tool and has an externally threaded outboard end 72 for threadedly receiving a nut 82 thereon. A conical compression sleeve 84 is mounted in the tapered end of the outer housing 62 and around the sheath. The nut 82 is threaded on the outboard end of the housing 62 so that it can be advanced and will therefore constrict the compression sleeve 84 so that it will tightly grip the outer periphery of the steel sheath 20.

When the temperature probe assembly 10 is installed in the cylinder head, as shown in FIG. 1, the "O" ring seal 24 seals against wall 46 and prevents leakage of coolant from passage 86 into the probe assembly and more particularly into bore 44.

The small diameter tip 16 of the probe member 12 has a plurality of annular grooves 18 formed therein which are spaced from one another and which are adapted to carry the beryllium/copper split rings 92 which provide good thermal contact with the wall of bore 44. Specifically, the split rings are made slightly larger in diameter than bore 44 and have the expected resilience of metal so that they are slightly reduced in diameter as the probe is inserted into bore 44. Furthermore, the outer surface 94 of rings 92 is curved so that a narrow annular line contact 96 is established with the wall of bore 44 as is diagrammatically shown in FIGS. 3 and 5. Each ring contacts the wall at predetermined spaced intervals along the depth of bore 44 which is drilled into inner wall 46 of the cylinder head 48.

Figures 3, 4, 5:
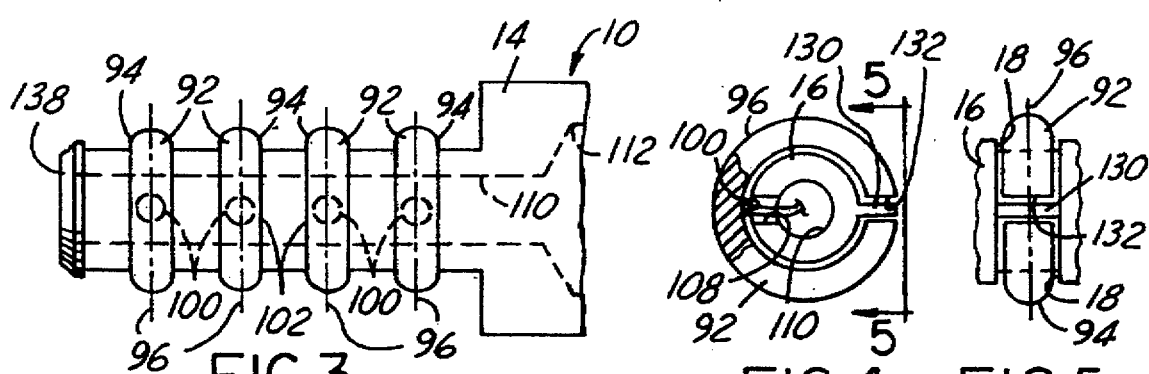
FIG. 3 is a side elevational view of the tip of the temperature probe of FIGS. 1 and 2.
FIG. 4 is a top view of one of the split rings contacts of the temperature probe of FIGS. 2 and 3.
FIG. 5 is an end view of one of the split rings of FIG. 4 taken generally along sight lines 5—5 of FIG. 4.
Figure 6:
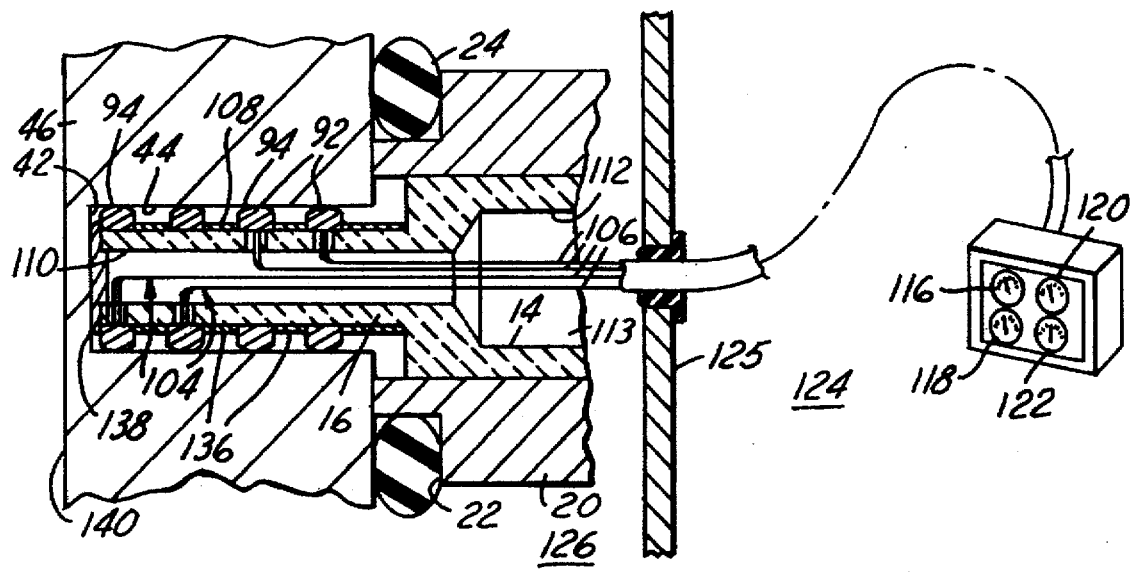
FIG. 6 is a diagrammatic view of this invention being employed in a test cell with instrumentation in a remote observer station.

As best shown in FIGS. 3, and 4, a thermocouple 100 is mounted to the underside or inner diameter surface of each ring 92. In the preferred embodiment, the thermocouples 100 have thin wire leads 106 that extend through the radial bores 108 in the tip 16. The leads 106 then extend axially through passages 110 and 112 of the probe 14 and through passage 30' of retainer cap 30. The wires 106 may be stabilized in the probe by filling interior space 114 with potting material. As shown in FIG. 6, each thermocouple is operatively connected to an associated one of the read-out gages 116, 118, 120, 122 which may be located in a comfortable compartment or room 124 separated by partition 125 from the test cell 126.

As best shown in FIG. 5, a raised cross tab 130 is formed in each of the grooves 18. The tabs 130 are adapted to extend into the gap or bight 132 of each the rings 92 with clearance to allow radial contraction of the rings 92. In other words, the clearance is sufficient so that the rings can contract inward when the tip is inserted into the bore 44. The tab 130 and the end of the rings defining the gap 132 can contact to prevent rotation of the ring 92 in groove 18.

Figure 7:
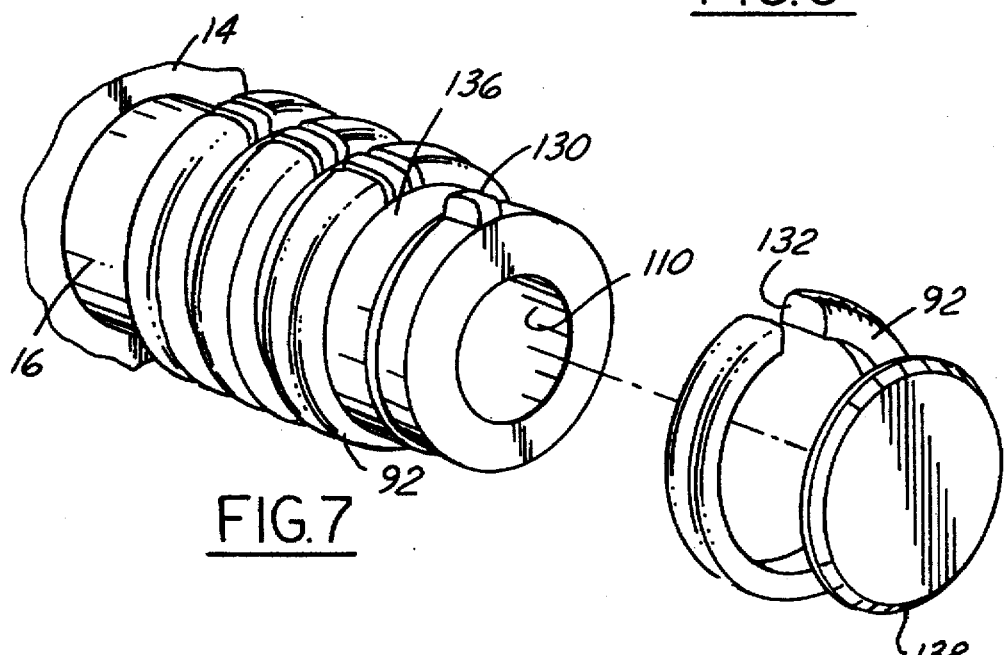
FIG. 7 is a pictorial and partially exploded view of the tip of the probe.

In the embodiment shown in FIGS. 6 and 7, an altered structure is illustrated. Instead of forming grooves 18 in the ceramic tip of the probe to accommodate the rings 92, the tip 16 in FIG. 6 has a substantially smooth cylindrical outer wall on which are mounted an axial ordered or arranged number of components, specifically, beryllium/copper split rings 92 separated one from another by annular ceramic spacers 136 with an outside diameter smaller than that of the split rings 92. The spacers 136 uniformly space the split rings 92 and provide thermal insulation therebetween. The spacers also facilitate the manufacturing and assembly process of the device.

The spacers 136 and split rings 92 are held in place on the small diameter ceramic tip by a ceramic plug 138 located at the end of the probe. The ceramic plug 138 is inserted and glued to the tip 16 after the split rings and spacers have been installed on the tip 16. The ceramic cross tabs 130 are also glued in place after the ceramic spacers and split rings have been arranged on the tip 16.

The annular line contact 96 provided by curved surfaces 94 are spaced axially along the known depth of bore 44. There is a high degree of accuracy in this arrangement which contributes greatly to the value of the subject multi-point temperature probe. Accordingly, as best shown in FIGS. 3 the line contacts 96 at known bore depths reveals the gradient and the temperature of the engine's wall adjacent the combustion chamber as the engine is operated under varying conditions. With this invention, an improved thermal analysis of combustion and boundary conditions can be readily made. Importantly, the errors occurring with the use of prior art pick-ups are reduced or substantially eliminated.

Figure 8:
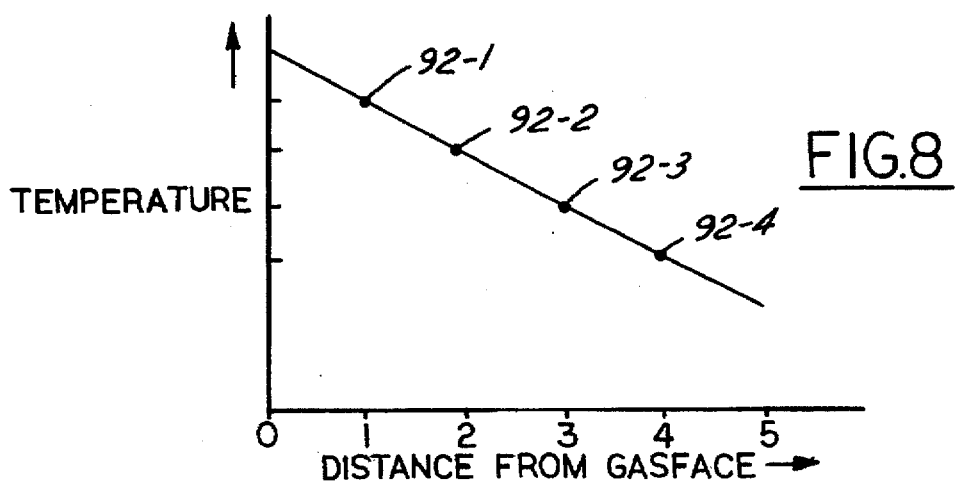
FIG. 8 is a graph illustrating temperature gradient reading using the temperature probe of this invention.

FIG. 8 illustrates an example of the temperature gradient measured across inner wall 46 from a gas face or surface 140 of combustion chamber 142 to the wall of coolant passage 87. As shown in FIG. 8, the temperature gradient slopes progressively downward from plotted points 92-1, 92-2, 92-3, 92-4 which correspond to the first, second, third, and fourth split rings 92. From this plot one can readily and quickly determine that cooling of the engine wall is sufficient and acceptable.

While a preferred embodiment of the invention has been shown and described, other embodiments will now become apparent to those skilled in the art. Accordingly, this invention is not to be limited to that which is shown and described but by the following claims.

What is claimed is:

1. A multi-point temperature probe for connection to associated temperature read out gages for measuring the temperature gradients in a heat conducting wall having a bore therein comprising an elongated main probe body of heat resistant material, said body having a tip of said material extending axially from one end thereof for operative insertion into the bore, said tip and body having an axial passage extending therein, a plurality of substantially annular heat pick-up rings operatively mounted on said tip, said rings being insulated and axially spaced from one another for axially spaced and substantially annular contact with the bore, a plurality of thermocouples, each of said thermocouples being operatively connected to an associated one of said heat pick-up rings, each of said thermocouples having thermocouple leads extending therefrom and through said axial passage in said tip and said body for operative connection to the associated temperature read-out gages.

2. The temperature probe defined in claim 1, wherein said heat conducting wall defines a combustion chamber for an internal combustion engine and wherein the bore in the wall is a cylindrical wall bore adjacent to said combustion chamber, each of said rings being a split metallic ring and being resilient to closely fit into the cylindrical bore for direct substantially annular contact therewith.

3. The multi-point temperature probe of claim 2, wherein each said split ring has a curved cross-section with an outer surface for substantially circular line contact with the cylindrical wall of the bore.

4. The temperature probe of claim 3, wherein each of said rings is formed with a gap therein, said tip of said probe being cylindrical in form and having a plurality of tabs extending radially therefrom, each of said tabs being received into an associated one of said gaps of said rings to prevent rotation of said rings relative to said tip.

5. A temperature probe comprising a body of a refractory material, said body having outboard and inboard ends, said inboard end being an elongated tip extending axially from said body, a plurality of substantially annular heat conducting contact members axially spaced and insulated from one another and operatively mounted on said tip, a plurality of thermocouples, each of said thermocouples comprising an electrical circuit of unlike metals extending through said body having a first juncture of said unlike metals operatively connected to an associated one of said contact members and having a second juncture of said unlike metals disposed at a station remote from said outboard end of said body, and separate gage means for each of said thermocouples for measuring the electrical current resulting from heat energy differentials occurring between said first and second junctures of each of said thermocouples.

6. A temperature probe adapted to be releasably mounted in a cylindrical bore of in a heat conducting wall, said probe including an elongated cylindrical body of refractory material and having inboard and outboard ends, said inboard end extending axially from said body and forming an elongated tip, said tip having at least one pair of axially spaced and substantially circular heat conducting contact rings mounted thereon insulated from one another and radially extending beyond the periphery of said tips for spaced contact with the wall of said bore, a thermocouple for each of said rings, each said thermocouple having first and second leads of unlike metals, each of said leads being connected at a first juncture to an associated contact ring and connected at a second juncture spaced from said probe, gage means connected to each said second juncture for detecting electric current flow in response to temperature differentials occurring between said first and second junctures, an elongated sheath disposed around said body, and a housing disposed around said sheath for releasably mounting said body of said probe and said sheath to said heat conducting wall.

7. The temperature probe of claim 6, wherein said inboard end is a cylindrical tip and said tip is of a diameter which is less than the diameter of said cylindrical body and said bore and wherein said tip has a plurality of annular ceramic spacers mounted thereon axially separating said rings from one another.

8. A multi-point temperature probe for measuring heat gradients in a heat conducting wall of an internal combustion engine, said heat conducting wall having a cylindrical bore therein for releasably receiving said probe comprising a centralized main body of heat resistant material, a tip extending axially from one end of said main body for insertion into the cylindrical bore, a plurality of substantially annular heat pick-up rings insulated and axially spaced from one another and operatively mounted on said tip and directly contacting said walls of the bore, a thermocouple operatively connected to each of the spaced pick-up rings, each of said thermocouples having thermocouple leads extending from each of said rings and outwardly of said body, a sheath surrounding said main body, a housing surrounding said sheath and having external threads thereon for threaded connection to the heat conducting wall to operatively secure said temperature probe to said wall of said engine.

* * * * *